United States Patent
Joyce et al.

(10) Patent No.: US 8,370,862 B1
(45) Date of Patent: Feb. 5, 2013

(54) COMMUNICATING BETWEEN SOFTWARE ENVIRONMENTS

(75) Inventors: Scott E. Joyce, Foxborough, MA (US); Bruce R. Rabe, Dedham, MA (US); Mark A. Parenti, Milford, NH (US); Timothy Cox, Mendon, MA (US); Eric S. Lewine, Apex, NC (US); Ralph J. Marshall, Hillsborough, NC (US)

(73) Assignee: EMC Corporation, Hopkinton, MA (US)

( * ) Notice: Subject to any disclaimer, the term of this patent is extended or adjusted under 35 U.S.C. 154(b) by 204 days.

(21) Appl. No.: 12/894,267

(22) Filed: Sep. 30, 2010

(51) Int. Cl.
*G06F 13/00* (2006.01)
(52) U.S. Cl. .................. 719/330; 719/310; 719/313
(58) Field of Classification Search .................. 719/330, 719/310, 313
See application file for complete search history.

(56) References Cited

U.S. PATENT DOCUMENTS

| | | | | |
|---|---|---|---|---|
| 7,216,351 | B1 * | 5/2007 | Maes | 719/328 |
| 2011/0035756 | A1 * | 2/2011 | Song | 719/313 |
| 2012/0079100 | A1 * | 3/2012 | McIntyre et al. | 709/224 |

* cited by examiner

*Primary Examiner* — Andy Ho
(74) *Attorney, Agent, or Firm* — Krishnendu Gupta; Jason A. Reyes; Deepika Bhayana

(57) ABSTRACT

A method for use in communicating between software environments is disclosed. A JavaScript connection is established between a Flex based operating environment and a Java based operating environment. Based on the JavaScript connection, a socket connection between the Flex based operating environment and the Java based operating environment is established. Based on the socket connection, remote procedure calls are executed between the Flex based operating environment and the Java based operating environment.

20 Claims, 3 Drawing Sheets

COMMUNICATING BETWEEN SOFTWARE ENVIRONMENTS

BACKGROUND

1. Field of the Invention

The present invention relates to communicating between software environments.

2. Description of Prior Art

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to the increased need for storage by integrating high capacity data storage systems, data communications devices (e.g., switches), and computer systems (e.g., host computers or servers) into so-called "storage networks" or "Storage Area Networks" (SANs.)

In general, a storage area network is a collection of data storage systems that are networked together via a switching fabric to a number of host computer systems operating as servers. The host computers access data stored in the data storage systems (of a respective storage area network) on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional storage management application generates a graphical user interface utilized by a storage administrator to graphically select, interact with, and manage local or remote devices and software processes associated with the storage area network. Based on use of the graphical user interface in combination with an input device such as a hand operated mouse and corresponding pointer displayed on a viewing screen or other display, a storage administrator is able to manage hardware and software entities such as file systems, databases, storage devices, volumes, peripherals, network data communications devices, etc., associated with the storage area network. Consequently, a storage management station and associated management software enables a storage administrator (a person responsible for managing the storage network) to manage the storage area network and its resources.

A typical computer network being used today that can run object oriented software is a client-server network, the client being the user (GUI) or workstation and the server being software (discrete or distributed throughout the network) which serves the client. In this network, a computer system can employ one or more object-oriented computer languages such as C++, XML (eXtensible Markup Language), Java, Flash, and/or others. Briefly, an object, in computer software terms, is a dedicated area of memory which can be thought of as an impervious container holding both data and instructions within itself, both defining itself and its relationships to other objects in the computer system or network. Such object or node can send and receive messages to and from other objects, respond and react to such messages (e.g. commands) but shall normally be impervious to internal scrutiny. For example, in a computer data storage system (a kind of computer) each object (system object) may describe or relate to a specific tangible detail in the storage system or in the storage system's processor (e.g., details such as those describing or relating to aspects of operation of the processor's cooling-fan, power switch, cache memory, power supply, disk drive interface, individual disks, etc.).

With respect to networks, people today use the World Wide Web for a variety of different and diverse tasks for example locating information, ordering and buying goods on-line and managing their finances. Many users expect that these applications will operate regardless of what type of computer platform is used.

Java technology, which is a trademark of Sun Microsystems, Inc, helps provide a solution by allowing the creation of computer platform independent programs. The Java technology includes an object oriented programming language and a platform on which to run the Java applications (known as Java Runtime Environment or JRE). Java is both a compiled and an interpreted language. The source code that has been written by the application developer is compiled into an intermediate form called a Java bytecode, which is a platform independent language. At a client machine, the java bytecodes are interpreted by the Java platform and the Java interpreter parses and runs each Java bytecode instruction on the computer. (If the Java bytecode is run as a applet, it may first be sent over the network to the client machine.)

Java's objected oriented programming language is based on using objects and classes and this paragraph will introduce the reader to a few basic concepts. Just like real world objects, software objects consist of a state and a behavior. A software object maintains its state in one or more variables and a variable is an item of data named by an identifier. A software object implements its behavior with methods and a method is a function associated with an object. Just like any other objected oriented programming language objects communicate with each other by passing messages. Further object oriented concepts are well known in the art and will not be described here further.

The Java platform includes the Application Programming Interface (API), which is a large collection of ready-made software components, which provide a variety of capabilities, and the Java Virtual Machine (JVM) which will be explained in the paragraph below. Together the JVM and the API sit on top of the hardware based computer platform and provide a layer of abstraction between the Java program and the underlying hardware.

The JVM is made up of software, which can run a Java program on a specific computer platform of a client machine. Before a Java program can be run on a JVM, the Java program must first be translated into a format that the JVM recognizes, which is called a Java class file format. The Java class file format contains all the information needed by a Java runtime system to define a single Java class.

Adobe Flex is a collection of technologies released by Adobe Systems for the development and deployment of cross platform rich Internet applications based on the Adobe Flash platform. Flex provides a workflow and programming model that is familiar to developers. Macromedia XML ("MXML"), an eXtensible Markup Language ("XML")-based markup language, offers a way to build and lay out graphic user interfaces. Interactivity is achieved through the use of ActionScript, the core language of Flash Player that is based on the European Computer Manufacturers Association ("ECMA") ECMAScript standard. A Flex software development kit ("SDK") comes with a set of user interface components including buttons, list boxes, trees, data grids, several text controls, charts, graphs and various layout containers. Other features such as web services, drag and drop, modal dialogs, animation effects, application states, form validation, and other interactions round out the application framework.

A Flex application may be a rich internet application ("RIA"). RIAs introduce an intermediate layer of code, often called a client engine, between the user and the server. This client engine is typically downloaded as part of the instantiation of the application, and may be supplemented by further code downloads as use of the application progresses. The client engine acts as an extension of the browser, and usually takes over responsibility for rendering the application's user interface and for server communication. What can be done in a RIA may be limited by the capabilities of the system used on the client, but in general, the client engine is programmed to perform application functions that its designer believes will enhance some aspect of the user interface, or improve its responsiveness when handling certain user interactions, compared to a standard Web browser implementation. Also, while simply adding a client engine does not force an application to depart from the normal synchronous pattern of interactions between browser and server, in most RIAs the client engine performs additional asynchronous communications with servers.

In a multi-tiered model, Flex applications serve as the presentation tier. Unlike page-based Hypertext Markup Language ("HTML") applications, Flex applications provide a stateful client where significant changes to the view don't require loading a new page. Similarly, Flex and Flash Player provide many useful ways to send and load data to and from server-side components without requiring the client to reload the view. To incorporate a Flex application into a website, one typically embeds Shockwave Flash (.SWF) file in an HTML, JavaServer Pages ("JSP"), Adobe, ColdFusion, or other type of web page. The page that embeds the SWF file is known as the wrapper. A wrapper consists of an <object> tag and an <embed> tag that format the SWF file on the page, define data object locations, and pass run-time variables to the SWF file. In addition, the wrapper can include support for history management and Flash Player version detection and deployment.

JavaScript is a Web scripting language and JavaScript source code may be directly included in HTML documents. HTML is a language used to create Web documents. JavaScript source code is typically embedded in HTML documents, by using a script tag, such as "<SCRIPT LANGUAGE=JavaScript>". A Web browser executes HTML documents containing JavaScript source code. Unlike compiled languages, JavaScript is an interpreted language, which means the Web browser executes each line of JavaScript as it comes to it. JavaScript programs run within the Web browser or other JavaScript-enabled applications to produce the desired results.

A socket is a software entity that provides a basic building block for interprocess communications, and functions as an endpoint of communication between processes. In particular, the socket is an object that identifies communication endpoints between two processes. The socket's API typically hides the protocol of the network architecture or the computer software architecture present in the host processors that the application processes are placed on. Thus, a socket allows the easy association of an endpoint such as an application process, any protocol, or protocol implementation. In the case of Java, a process may be provided that allows communication between a Java code and an executable software file which permits the Java code to receive access to the internal system resources of the user's computer. The Java code is arranged to be configured as a server in the client's configuration, by means of the establishment of a server socket communication channel ("server socket"). Once established, that socket communication channel is used for allowing full ordered, error-free communication between the Java code and the local executable file, thereby allowing the Java code to make use of the internal system resources of the user's computer.

Remote procedure calls (RPCs) are used in many different types of scenarios. In a common scenario, RPCs generally enable a client system to request services provided on a server systems ("RPC server system"). In the common scenario, the RPC server system is implemented to execute a service upon receiving an RPC request, and a client system causes execution of the service by sending the RPC request. The results of execution of the service are then generally provided to the client system sending the RPC request.

XML-RPC is an RPC method that uses textual documents to represent data passed in the RPC. Each piece of data is represented using an XML document. XML-RPC can be used to facilitate communication between a server (e.g., a local server or a central server) and a client machine. In particular, XML-RPC is a simple and portable way to make remote procedure calls over HTTP. It can be used with Perl, Java, Python, C, C++, PHP and many other programming languages. In addition, XML-RPC allows software running on disparate operating systems, running in different environments to make procedure calls over a data network. It is remote procedure calling using HTTP as the transport and XML as the encoding. XML-RPC is designed to be as simple as possible, while allowing complex data structures to be transmitted, processed and returned.

In a broad sense, serialization is the conversion of an object from one representation or format to another. Serialization generally implies a two way process: converting an object from an initial representation to some other representation, and then converting that other representation back to the initial representation. Although at times, converting back to the initial representation may be referred to as deserialization, serialization is a generic term that encompasses both the initial conversion of the initial representation and the subsequent conversion back to the initial representation.

For example, in-memory or live objects may be serialized to persistent or transient objects that are suitable for durable storage or transmission over a network. Currently, it is common practice to use XML as a serialization format for both storage and data transmission. Once stored or transmitted, the XML representation of the object may be serialized (or deserialized) from the XML representation back to an in-memory or live object. The software that performs serialization typically is called a serializer.

SUMMARY OF THE INVENTION

A method for use in communicating between software environments is disclosed. A JavaScript connection is established between a Flex based operating environment and a Java based operating environment. Based on the JavaScript connection, a socket connection between the Flex based operating environment and the Java based operating environment is established. Based on the socket connection, remote procedure calls are executed between the Flex based operating environment and the Java based operating environment.

BRIEF DESCRIPTION OF THE DRAWINGS

Features and advantages of the present invention will become more apparent from the following detailed description of exemplary embodiments thereof taken in conjunction with the accompanying drawings in which.

DESCRIPTION OF EMBODIMENT(S)

Described below is a technique for use in communicating between software environments. In at least one implementation, the technique may be used to help provide for Flex/Java communication enhancements. In at least one implementation using the technique, two way remote procedure calls are provided such that messages can be sent between software environments based on Flex and Java respectively. In particular, such an implementation includes anonymous two way remote procedure calls, and performs a handshake that dynamically determines free ports on client systems that can be used for socket based communication. Information identifying these free ports is passed using JavaScript, and future communication uses sockets. This implementation allows for multiple instances of the same application to run without user configuration, which is a key advantage for running the implementation as a Web application.

This implementation also takes into consideration that upon startup of the Web application either Java software (e.g., Java applet) or Flex software (e.g., Flex application) could load first, before the other software. With respect to such load timing, each time when the implementation is running as a Web application it is not certain which software will be finished loading and thereby become active and start processing first. As described below, since either type of software can make calls to the other, it is preferable to avoid forcing the calling software to wait to ensure that the other software is active before beginning to communicate. A respective communication layer on each software side can queue up messages until the other side is ready, which allows the calling software to be unaware of the loading status of the other software.

Figure 1:
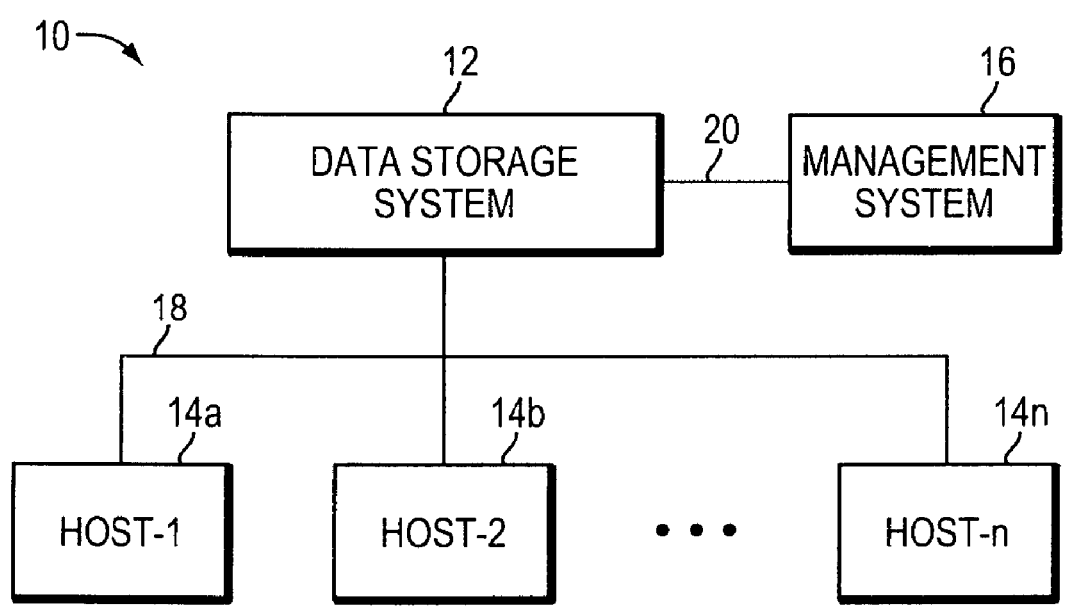
FIGS. 1, 3 are illustrations of systems that may be used with the technique herein.

Referring now to FIG. 1, shown is an example of an embodiment of a computer system that may be used in connection with performing the technique described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a 14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to one of the foregoing logically defined devices or volumes.

Figure 2:
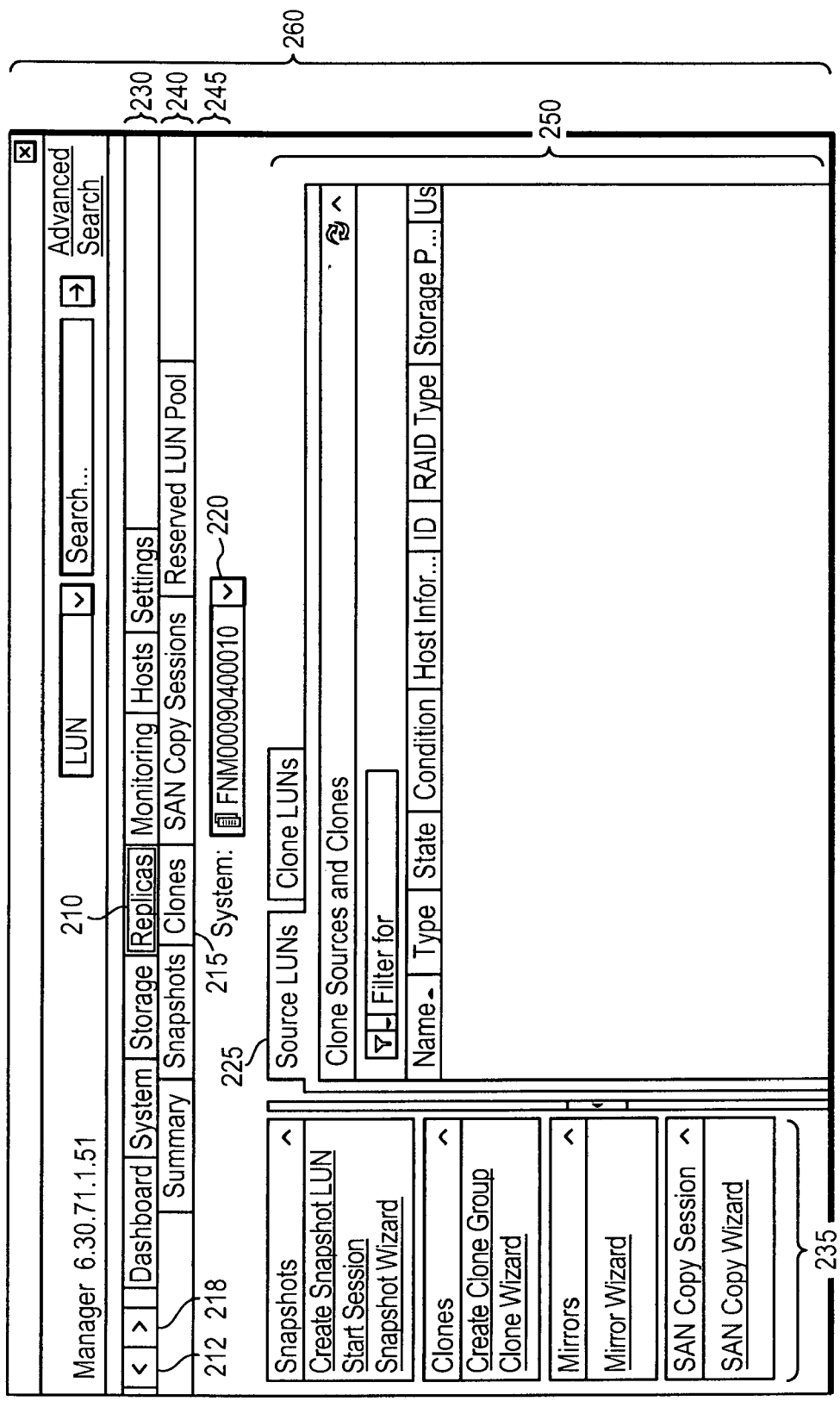
FIG. 2 is an illustration of user interface screens and content that may be used with the technique herein.

Referring now to FIG. 2, shown is an example of a GUI 260 that may be used in connection with the technique described herein and that may be included in the management system 16. As shown, GUI 260 has a section panel 230 that has buttons including REPLICAS button 210 and a backward navigation button 212 and a forward navigation button 218. GUI 260 also has s subsection panel 240 that has buttons including CLONES button 215. A system selection area 245 of GUI 260 has a system selection pulldown menu 220. GUI 260 also has a links table 235 and main body area 250 that has tabs including tab 225.

Figure 3:
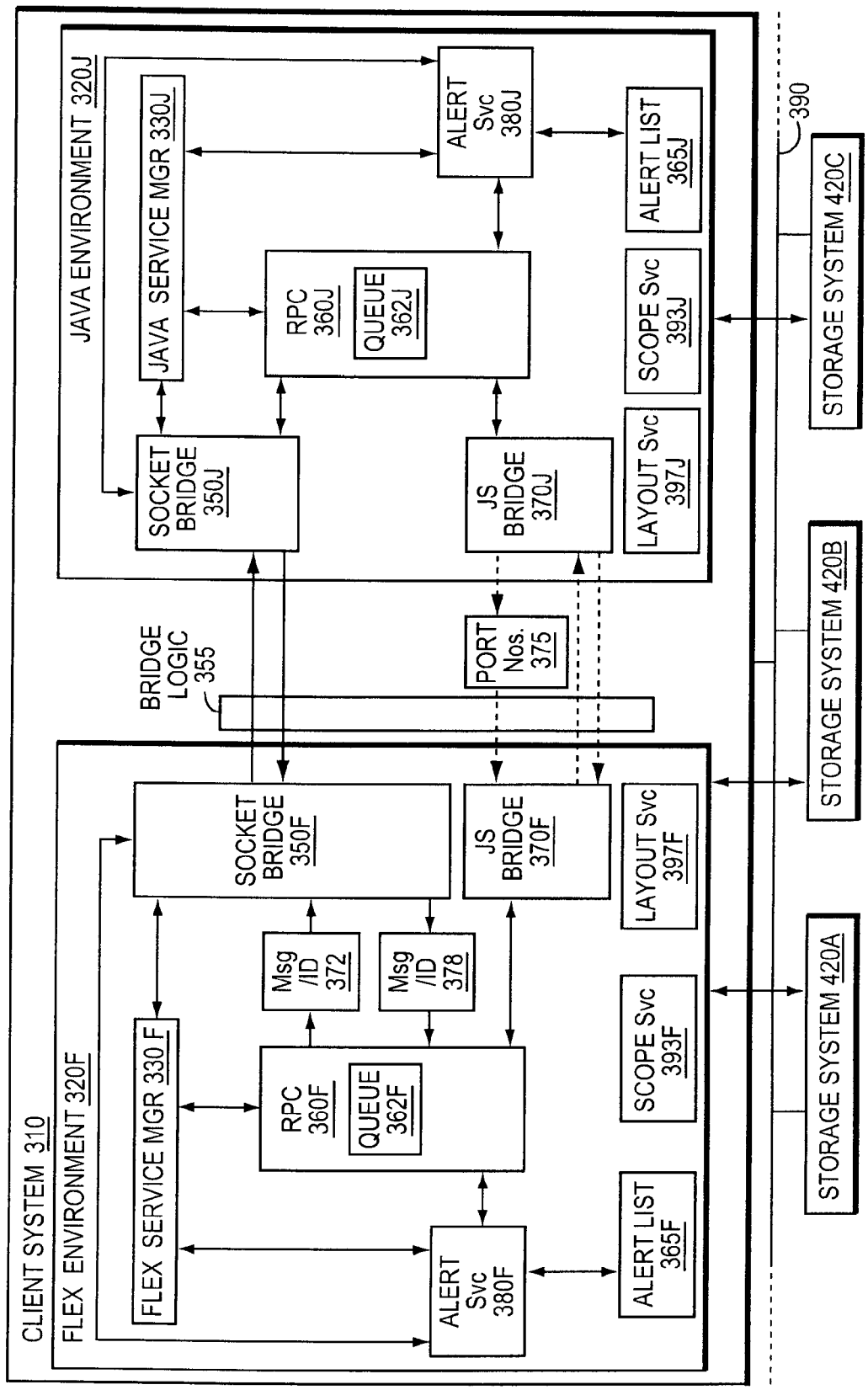

FIG. 3 illustrates details of an implementation example that uses the technique, and that may be used in producing and/or controlling GUI 260. Client system 310 (e.g., a computer running a Web browser) may be, include, or be included in management system 16, and may be used in producing GUI 260, one or more of storage systems 420A, 420B, 420C may be, include, or be included in data storage systems 12, and network 390 may be, include, or be included in communication medium 20.

System 310 has Flex operating environment 320F and Java operating environment 320J, which includes the JRE.

In operation, system 310 relies on Flex operating environment 320F on which a Flex service manager 330F executes, and also relies on Java operating environment 320J on which a Java service manager 330J executes. Managers 330F, 330J are applications that are not included in environments 320F, 320J respectively but that execute on environments 320F, 320J respectively.

On startup, manager 330F causes startup of other applications that execute on environment 320F, which other applications, depending on the implementation. may include, for example, alert service 380F, scope service 393F, and layout service 397F. Similarly, on startup, manager 330J causes startup of other applications that execute on environment 320J, which other applications, depending on the implementation. may include, for example, alert service 380J, scope service 393J, and layout service 397J. These other applications are not included in environments 320F, 320J respectively but execute on environments 320F, 320J respectively. Alert services 380F, 380J are used for notifying the user about conditions or events within the storage system, scope services 393F, 393J are used for affecting GUI 260 based on which storage system is selected, and layout services 397F, 397J are used for laying out GUI 260.

Communications between services running on environment 320F and services running on environment 320J may be accomplished as described below using a socket bridge 350F, a JavaScript based ("JS") bridge 370F, and RPC logic 360F, all executing on environment 320F, and a socket bridge 350J, a JS bridge 370J, and RPC logic 360J, all executing on environment 320F, and JavaScript based bridge logic 355.

Environments 320F, 320J are started up in system 310 by JavaScript logic, e.g., using a same JavaScript wrapper. On startup of environments 320F, 320J, a two stage process is executed to establish support for communications between services running on environment 320F and services running on environment 320J. In a first stage, JS bridge 370F is started up and JS bridge 370J is started up, and a handshake procedure is executed between bridge 370F and 370J. (Bridges 370F, 370J can communicate with each other because both environments 320F, 320J support JavaScript such that bridges 370F, 370J can expose JavaScript methods outside their respective environments 320F, 320J, and can call methods outside their respective environments 320F, 320J.) In the handshake procedure, each of bridges 370F, 370J, upon starting up, sends off an initial message to the other of bridges 370F, 370J, e.g., through use of logic 355, and awaits the initial message from the other of bridges 370F, 370J. Thus, regardless of which of bridges 370F, 370J completes startup first, inter-environment communication (i.e., communication between environments 320F and 320J) can proceed once that bridge receives the initial message from the other of bridges 370F, 370J. Bridge 370J (or other logic that feeds bridge 370J) determines a set of free ports on system 310 that may be used to form a socket connection described below, and sends a message to bridge 370F identifying the set of free ports (as port numbers 375).

In the second stage of the two stage process, the set of free ports is used by socket bridges 350F, 360J to establish a socket connection. (Sockets are supported by both environments 320F, 320J, but in at least one embodiment, environment 320F does not support server sockets, so inter-environment communications relies on a message identifier system described below to match requests with responses.) The socket connection using bridges 350F, 360J can be used by RPC logic 360F, 360J to pass messages between environments 320F and 320J. RPC logic 360F and 360J have respective message queues 362F, 362J where messages bound for the other environment may be held temporarily awaiting their turns.

With respect to the message identifier system, each message used in the inter-environment communications has a message identifier so that when the other environment returns a related message, the related message includes the same message identifier, which allows the contents of the messages to be linked. In particular, for example, based on a request from alert service 380F, RPC logic 360F can issue an outgoing message 372 with an identifier XYZ to environment 320J requesting some information, and when RPC logic 360F receives an incoming message 378 including the same identifier XYZ, RPC logic 360F can reply to alert service 380F with the contents of message 378. The message identifier system also works in the other direction in the inter-environment communications. For example, based on a request from alert service 380J, RPC logic 360J can issue an outgoing message with an identifier ABC to environment 320F delivering some information to a service executing on environment 320F, and when RPC logic 360J receives an incoming message including the same identifier ABC, RPC logic 360J can reply to alert service 380J with the contents of such incoming message, which may include an acknowledgement of successful receipt of the information by the service executing on environment 320F.

In at least one embodiment, the functionality described above may be used as now described in an example. Alert service 380F may be responsible for making an alert list 365F available to the user of GUI 260. Alert list 365F may include a list (e.g., a comprehensive list) of conditions or events within a storage system, e.g., system 420A, or within a set of storage systems (e.g., systems 420A, 420B, and 420C). Alert service 380F may be able to populate some of list 365F based on information that is accessible from environment 320F, e.g., certain information about system 420A, but alert service 380F may also need to be able to populate some of list 365F based on information that is accessible only from environment 320J, e.g., certain information about system 420C. Such information that is accessible only from environment 320J may be available from alert service 380J. Thus, alert service 380F uses inter-environment communications to retrieve such information from alert service 380J.

In the example, based on a remote procedure call from service 380F to logic 360F for such information ("requested information"), which call identifies service 380J as the target of such call, logic 360F issues a message also identifying service 380J to bridge 350F which passes the message to bridge 350J. Bridge 350J uses a lookup service of manager 330J to determine a specific running instance of service 380J. A local procedure call is made to such instance, which retrieves the requested information (e.g., from local alert list 365J) and returns the requested information in another message delivered through RPC 360J, bridge 350J, and bridge 350F to logic 360F, which responds to service 380F with the requested information.

In another example, based on a remote procedure call from service 380J to logic 360J for modifying list 365F, which call identifies service 380F as the target of such call, logic 360J issues a message also identifying service 380F to bridge 350J which passes the message to bridge 350F. Bridge 350F uses a lookup service of manager 330F to determine a specific running instance of service 380F. A local procedure call is made to such instance, which makes the modification to list 365F and returns an acknowledgement in another message delivered through RPC 360F, bridge 350F, and bridge 350F to logic 360J, which responds to service 380J with the acknowledgement.

One or more implementations may include one or more of the following. Communication between bridges 350F, 350J may be performed (e.g., wrapped) in accordance with XML-RPC protocol. At least some objects and/or data may be serialized, e.g., using custom serialization. In particular, customized serializers and deserializers (i.e., software logic) may be registered for use with specific types of objects, and when such an object is to be transferred (i.e., communicated) between environments, an appropriate custom serializer is invoked in one environment to prepare (e.g., break down) the object for transfer, and after transfer a corresponding custom deserializer is invoked in the other environment (e.g., to reconstruct the object). JS bridge based on bridges 370F, 370J may continue to be used though it is slower than the socket connection and has a size limit. The socket connection may be used to make RPC calls in both directions. Determining the set of free ports may allow more than once instance of system 310 to be executed in the same computer system, e.g., so that multiple instances are not trying to use the same hardcoded port numbers. The remote procedure call may take the form exemplified by rpcclient.call("alertservice::getalerts", parameters, callback), where "alertservice" is the service in the other environment, "getalerts" is a method to be invoked on such service, "parameters" is a set of parameters to be used with such method, and "callback" is a local method ("callback method") to be invoked when an incoming message is received in response to the remote procedure call. For example, upon receiving the remote procedure call, RPC logic may associate a resulting outgoing message's message identifier with the callback method so that later, when an incoming message including the message identifier is received, RPC logic can invoke the callback method to direct the incoming message's contents to the originator of the remote procedure call. (Thus in at least some implementations the callback method need not be included in the outgoing message.) Successful inter-environment communication may rely on a service in one environment being able to identifying exactly by name another service in the other environment. Client system 310 or one or both environments 320F, 320J and associated services and other software logic may be executed on a different computing systems such as system 420A. One of the ports in the set of free ports may be used to navigate a security feature, particularly to retrieve a policy file that allows one or both environments to communicate with a local host, e.g., instead of or in addition to a source computer such as system 420A from which the environment was invoked via JavaScript. Queues 362F, 362J may allow services such as services 393F, 393J to start issuing messages immediately upon startup, which messages are sent out of such queues as soon as inter-environment communications are established.

Aside from the Java environment, any of different implementation technologies may be used in an embodiment in connection with presenting the GUI to a user. As an example, implementation technologies that may be supported include HTML, a technology such as Nexweb which uses graphics or drawing commands with a rendering engine, AJAX (Asynchronous Javascript And XML), Adobe® Flash™ or Adobe® Flex™, as well as a Windows-based application written in any one or more different programming languages used to render the UI.

Each component described herein may be a means for performing the functions described. Each components described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in communicating between software environments, the method comprising:
    establishing a JavaScript connection between a Flex based operating environment and a Java based operating environment on a system, wherein the system includes the Flex based operating environment and the Java based operating environment;
    based on the JavaScript connection, establishing a socket connection between the Flex based operating environment and the Java based operating environment; and
    based on the socket connection, executing remote procedure calls between the Flex based operating environment and the Java based operating environment.

2. The method of claim 1 wherein establishing the JavaScript connection between the Flex based operating environment and the Java based operating environment includes a handshake procedure between a first JavaScript based bridge located on the Flex based operating environment and a second JavaScript based bridge located on the Java based operating environment.

3. The method of claim 2 wherein the second JavaScript based bridge located on the Java based operating environment determines a set of free ports that can be used to form the socket connection.

4. The method of claim 3 wherein the handshake procedure includes an exchange of initialization messages, wherein one or more of the initialization messages specifies the set of free ports.

5. The method of claim 4 wherein a first port specified in the set of free ports allows for a first instance of a client system to be executed in a computer system and a second port specified in the set of free ports allows for a second instance of the client system to be executed in the same computer system.

6. The method of claim 4 wherein the socket connection between the Flex based operating environment and the Java based operating environment is established by using one of the ports specified in the set of free ports.

7. The method of claim 1 wherein executing remote procedure calls includes passing messages between the Flex based operating environment and the Java based operating environment.

8. The method of claim 7 wherein the messages have unique message identifiers.

9. The method of claim 7 wherein the unique message identifiers are associated with one or more callback methods.

10. The method of claim 1 wherein the Flex operating environment can use the socket connection to retrieve information accessible only to the Java operating environment, and the Java operating environment can use the socket connection to retrieve information accessible only to the Flex operating environment.

11. A system for use in communicating between software environments, the system comprising:
    a processor;
    first logic establishing a JavaScript connection between a Flex based operating environment and a Java based operating environment on the system, wherein the system includes the Flex based operating environment and the Java based operating environment;
    based on the JavaScript connection, second logic establishing a socket connection between the Flex based operating environment and the Java based operating environment; and
    based on the socket connection, third logic executing remote procedure calls between the Flex based operating environment and the Java based operating environment.

12. The system of claim 11 wherein establishing the JavaScript connection between the Flex based operating environment and the Java based operating environment includes a handshake procedure between a first JavaScript based bridge located on the Flex based operating environment and a second JavaScript based bridge located on the Java based operating environment.

13. The system of claim 12 wherein the second JavaScript based bridge located on the Java based operating environment determines a set of free ports that can be used to form the socket connection.

14. The system of claim 13 wherein the handshake procedure includes an exchange of initialization messages, wherein one or more of the initialization messages specifies the set of free ports.

15. The system of claim 14 wherein a first port specified in the set of free ports allows for a first instance of a client system to be executed in a computer system and a second port specified in the set of free ports allows for a second instance of the client system to be executed in the same computer system.

16. The system of claim 14 wherein the socket connection between the Flex based operating environment and the Java based operating environment is established by using one of the ports specified in the set of free ports.

17. The system of claim 11 wherein executing remote procedure calls includes passing messages between the Flex based operating environment and the Java based operating environment.

18. The system of claim 17 wherein the messages have unique message identifiers.

19. The system of claim 17 wherein the unique message identifiers are associated with one or more callback methods.

20. The system of claim 11 wherein the Flex operating environment can use the socket connection to retrieve information accessible only to the Java operating environment, and the Java operating environment can use the socket connection to retrieve information accessible only to the Flex operating environment.

* * * * *